United States Patent [19]

Boscolo et al.

[11] Patent Number: 4,833,685
[45] Date of Patent: May 23, 1989

[54] LASER CAVITY OPTICALLY PUMPED AND HAVING A CARRYING TUBE

[75] Inventors: Ilario Boscolo, Bussero; Gino Pastore, Arnesauo, both of Italy

[73] Assignee: Enea-Comitato Nazionale Per La Ricerca E Per Lo Sviluppo Dell'Energia Nucleare E Delle Energie Alternative, Rome, Italy

[21] Appl. No.: 169,431

[22] Filed: Mar. 17, 1988

[30] Foreign Application Priority Data

Mar. 20, 1987 [IT] Italy .................. 47757 A/87

[51] Int. Cl.⁴ .................................. H01S 3/03
[52] U.S. Cl. .................................. 372/61; 372/4; 372/92; 372/35
[58] Field of Search .............. 372/34, 61, 33, 35, 372/4, 20, 99, 92

[56] References Cited

U.S. PATENT DOCUMENTS 3,875,530 4/1975 Manaikian .................. 372/65
3,928,816 12/1975 Hartwick et al. .................. 372/4

Primary Examiner—Léon Scott, Jr.
Attorney, Agent, or Firm—Stevens, Davis, Miller & Mosher

[57] ABSTRACT

A FIR Laser cavity comprising a pair of concentric tubes of heatproof dielectric, a pair of nozzles intended for circulating within the space between said pair of tubes a refrigerating and thermally stabilizing fluid; a pair of laser heads disposed at the two ends of said tubular assembly which heads are provided with optical elements; a differential thread sleeve mounted concentrically with said tubes and intended for obtaining the longitudinal micropositioning of one of said heads with respect to one another; two series of three screws which are mounted with a starlike symmetry on said heads and intended for allowing a fine adjustment of the optics carried by said heads along two axes perpendicular to one another and with respect to the geometrical axes of said tubes by means of the elastic deformation of an O ring which is interposed between each head and the tubular body and an output optics carrier and comprising either a reflector and a window for the hermetic seal, or by the reflector alone, which is glued on the laser head.

12 Claims, 3 Drawing Sheets

LASER CAVITY OPTICALLY PUMPED AND HAVING A CARRYING TUBE

DESCRIPTION

The object of this invention is a cavity for the optically pumped infrared lasers (FIR) particularly adapted for high power FIR lasers. Said cavity has a load bearing structure a pair of coaxial tubes of heatproof dielecric material such as for instance "pyrex" or quartz.

The known technique for the cavities of the laser of the above type, provides a device which comprises four rods of super invar or of quartz (of which the diameter is larger than 2 cm) which form the load bearing structure of the various components of the laser such as heads, tube, the system for connecting the tube with the heads and the translating system for the cavity tuning. In this device the required mechanical and thermal stability is ensured by the good design of the heads and of the tuning mechanism. Such system shows anyway different thermal elongations of the different materials by which the several pieces are comprised and because of the local non-elasatic deformations of the materials due to the strength of 20–25 kg applied to both the laser head by the atmospheric pressure (the inner diameter of the pyrex tube is always greater than 25 mm and in some lasers it can be greater than 50 mm).

This problem of the mechanical and thermal stability is critical for the FIR lasers. This is due both because of the waveguide operation whereby to small deformations of the cavity (lower than one micron) valuable variations correspond to the power and frequency and because the gain curve is very narrow (about some tenths of MHz to which an elongation of 10 micron corresponds when the cavity length is 2 m long).

According to the invention, a load bearing tube assembly is provided along with a micrometric screw which is concentric with the tube and attached to the same tube and "fixed" optics-carrying heads that is such that the micro-positioning is actuated by pressing on a single O ring when aligning only. The system is very stable because of its cylindrical symmetry and furthermore it is mechanically much simple.

The cylindrical symmery makes the assembly indifferent to pressure. Any water circulation (either in a closed circuit or from a tap) ensures the length stability of the optical cavity.

Another teaching of this invention consists of the fact that the positioning of the laser is rendered docile. In face because the laser is a glass tube of which the diameter is 4 cm, the laser is so light and compact that it can be micropositioned along the direction of the pump laser-beam. According to the old technique instead the alignment always requested the guide of the pump laser by means of a pair of mirrors.

Finally it is to be underlined that the cost of the cavity according to the invention is remarkably reduced with respect to the cost of the cavities as fabricated according to the preceding techniques.

The invention will be now described with reference to the attached drawings which represent as an example and not a limitation a preferred embodiment of this invention.

In the drawings:

FIG. 1 and 1A, taken together show an axial section of the device according to the invention;

Figure 1:
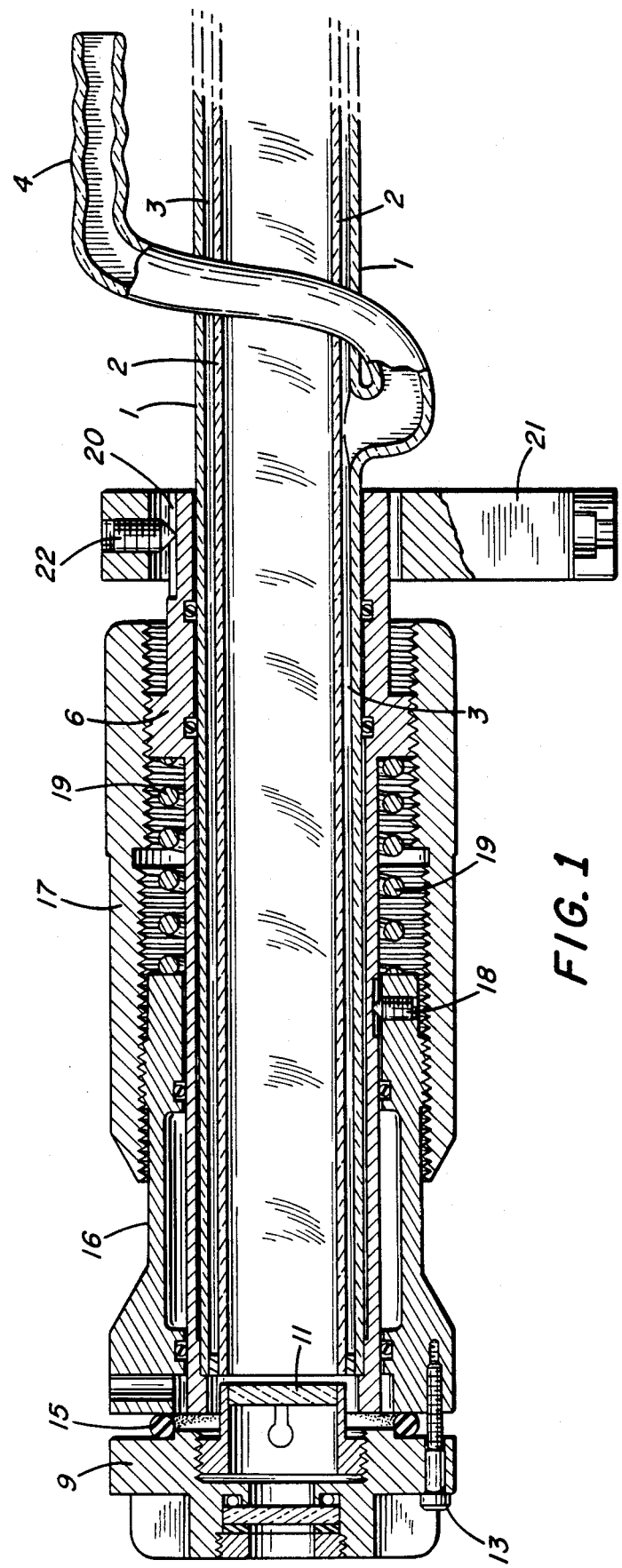
Figure 1A:
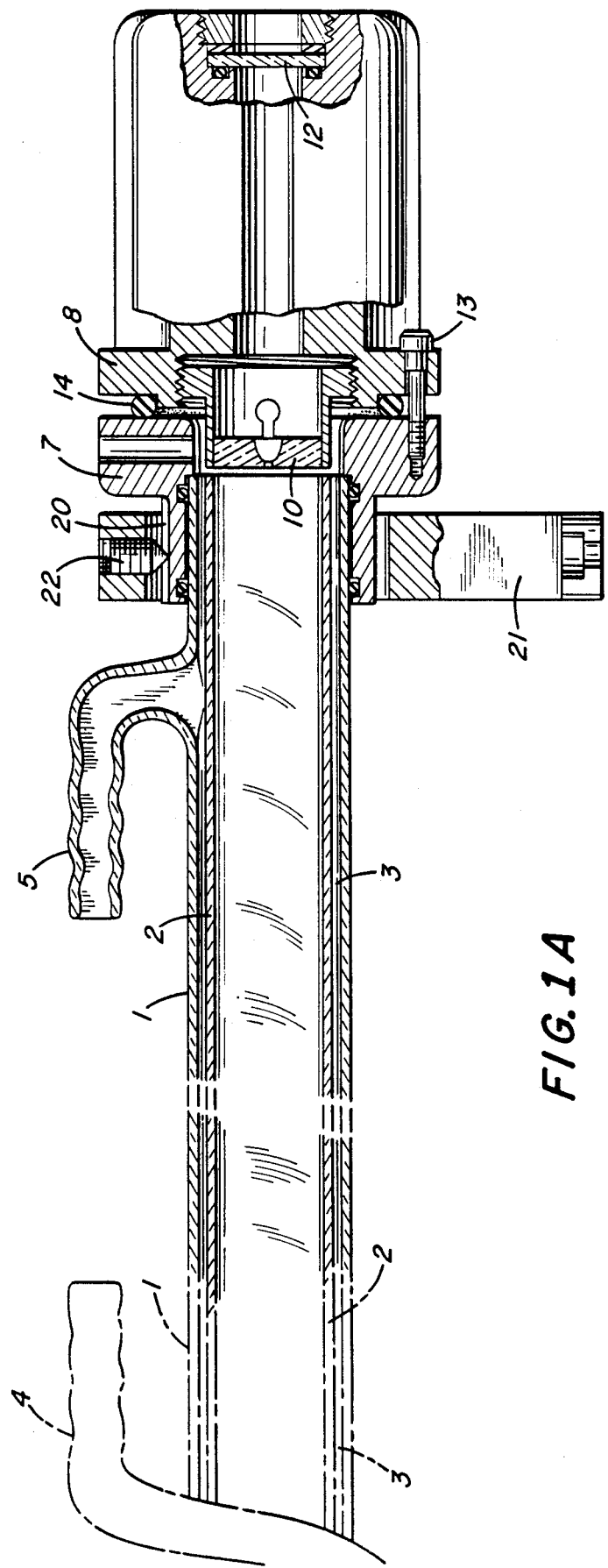
Figure 2:
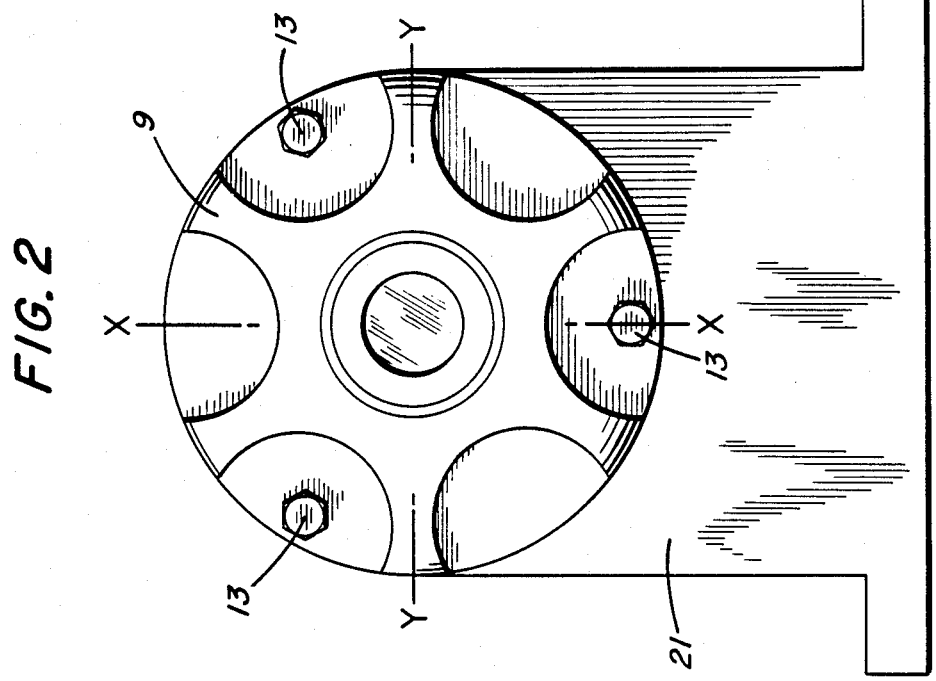
FIG. 2 shows a front view.

With reference to the drawings the number 1 and 2 indicate two concentric tubes having the same length and comprising a dielectric heatproof material, for instance pyrex or other technologically fit material. Within space 3 which communiates with fittings 4 and 5, water circulates of which the purpose is for insuring the requested thermal stability and the cooling of the mechanical components.

At the ends of the outer tube 1 the fixed barrel 6 and the coupling sleeve 7 are attached by heads glueing. At the input 8 and output 9 which are provided with cooling fins, optics 10 and 11 are mounted. From what preceeds its clearly appears that the elongations of the mechanical components occur towards the center of the tube and the optics position rests unchanged.

The ZnSe window 12 is located at 10 cm from the input mirror 10 hole. This allows to prevent a power high density on the window when the CO2 laser beam is focalized at the hole. The rotation about axes x,y perpendicular to the geometrical axis of the cavity (and then the alignment of the two optics) is accomplished by means of three screws 13 which are positioned at 120 deg on each head. An O ring 14 interposed between head 8 and sleeve 7 permits the fine positioning of the mirror by acting on the three screws 13. Similarly another turn of screws allows the adjustment of the output head 9 by means of second O ring 15.

Whenever a very high vacuum seal is required (for instance when the laser means implies the use of very expensive gases) the "conflat" seals technique can be used.

The micrometric adjustment of the cavity lenghs is made by a differential screw system. Fixed barrel 6 has at one end a threading with 1 mm pitch and at the other end mobile barrel 16 slides drags the output head 9 with the related optics. Mobile barrel 16 has at its outside a threading of which the pitch is 0,9 mm. Cylinder 17 which is screwed on both barrels displaces one with respect to the other through 100 micron at one turn. Any rotation of the two barrels with respect to one another is prevented by plug 18. Furthermore between the two barrels a spring 19 is positioned by which the vacuum thrust is nearly totally compensated. The rotatory movement of cylinder 17 is then soft and can be obtained either by hand or by a motor. On fixed barrel 6 and on sleeve 7 three grooves 20 are provided which are angularly separated by 120 deg, from one another, the upper one being a bearing for screw 22 while the other two are attachments. The purpose of said grooves is for hanging up supports 21 which at their turn by means of similar screws 22 arranged at 120 deg allow fine displacements of the whole laser.

Figure 3:
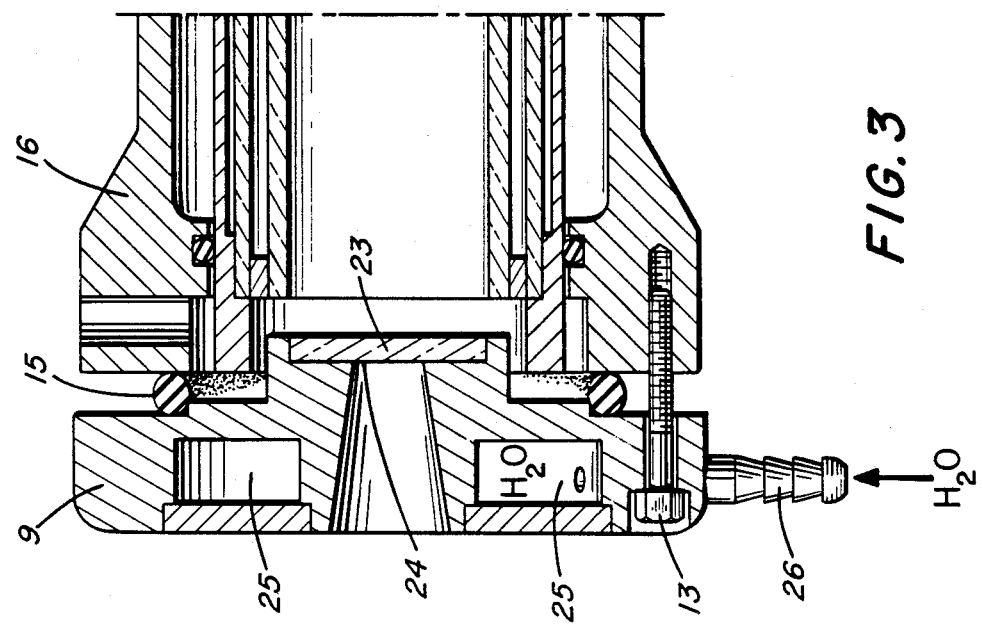
FIG. 3 shows an output head to be used with a cavity laser according to the invention.

Tha gas input is through a hole which is provided on the fixed barrel and vacuum is applied through a hole provided in the sleeve. In FIG. 3, as already said, an output head is illustrated according to the invention. Head 9, in this case carries the output reflector 23 which totally glued on the same head with the exception of the circular central area 24 (of which the diameter is about 1 cm) from which the laser radiation goes out. In the annular space 25 cooling water is circulated which goes into and out through a pair of fittings 26.

This type of variant allows to suppress the second window of crystal quartz as a vacuum seal in as much as disk 23 is glued over the most of its surface whereby there is no deformation danger. It obviously appears that by suppressing said window a sensitive increase of the laser efficiency is implied, in addition to an economical saving as a consequence of the suppression of a high cost optics due to the material and to the required optical work.

A second important advantage relies on the fact that the use is no more required for a quartz or silicon disk of which the surface facing the laser inside has a "coating" for reflecting the pump radiation. In fact, due to the cooling the disk 23 temperature attains such values which are about 50 deg C that is very far from the crack point of quartz or of silicon. The suppression of the "coating" signifies to make the reflector technologically very simple, readily fabricated and then of low cost.

The laser which is equipped with the cavity according to the invention provides a power stability, after about one hour conditioning which is higher than 1 percent for various operating hours.

The present invention has been illustrated and described in a preferred embodiment thereof; however there is understood that structural variants can be introduced therein without departing from the protective scope of the present exclusive patent-right.

We claim:

1. A FIR laser cavity comprising a load bearing tubular structure defining a longitudinal axis and made of heatproof dielectric material, said tubular having an input end and an output end; an input head mounting optics, an output head mounting optics; adjustable means for mounting said input head to said input end; adjustable means for mounting said output head to said output end, said adjustable mounting means for said input and output heads enabling orientation of said optics around X and Y axes orthogonal to each other and perpendicular to said longitudinal axis; and means to reciprocally adjust said optics along said longitudinal axis mounted on said tubular structure.

2. The cavity according to claim 1 wherein said tubular structure is comprised of two spaced concentric heatproof dielectric material tubes and means for circulating a cooling fluid between said tubes.

3. The cavity according to claim 1 wherein said reciprocally adjusting means comprises a first externally threaded barrel concentrically mounted to said tubular structure, a second externally threaded barrel fixed to said output head and slidably mounted on said tubular structure and an internally threaded sleeve threaded on said first and second barrels.

4. The cavity according to claim 3 including a spring mounted inside said sleeve and coaxial to said tubular structure and said first and second barrels for counteracting vacuum thrust and rendering soft the rotation of said sleeve and the sliding of the second barrel along the longitudinal axis.

5. The cavity according to claim 1 wherein said adjustable mounting means comprise three screws disposed at 120 degree to each other on each of the input and output heads. said screws being engaged with said tubular structure and an O ring interposed between each of said input and output heads and the tubular structure, each said O ring elastically absorbing the trim changes of said head produced by said screws.

6. The cavity according to claim 5 wherein said adjustable mounting means for said input head comprises an element mounted on said tubular structure, the cross section of which is different from the cross section of said tubular structure, said element having a projection which defines three seatings for said screws.

7. The cavity according to claim 1 wherein the dielectric material is selected from the group consisting of pyerx, quartz, and metal.

8. The cavity according to claim 1 including a pair of supports each of which carries three screws disposed at a 120 degree angle with respect to each other and a barrel mounted to said tubular structure and wherein said barrel and said element define longitudinal grooves to seat said screws of said supports.

9. The laser cavity according to claim 1 wherein the optic for the input head comprises a reflecting mirror having a central hole for the input of the pump radiation and the optic for the output head comprises a hybrid mirror that reflects pump radiation and semi-reflects laser radiation in the far infrared.

10. The cavity according to claim 9 wherein said hybrid mirror comprises a crystal quartz or silicon plate of which one surface has a $CO_2$ reflecting coating and, over said coating, a metal deposit with a central hole or a reticular structure.

11. The cavity according to claim 1 wherein said input head and output head are provided with a window for inputting $CO_2$ and said output head is provided with a window which is transparent to the far infrared radiation for the vacuum seal.

12. The cavity according to claim 1 wherein said output head comprises a hybrid mirror having an outer surface glued to said head which defines a hole at its center for the output of the radiations and defines a space cicumscribing said hole for refrigerating liquid.

* * * * *